(12) United States Patent
Taylor (10) Patent No.: US 8,332,898 B2
(45) Date of Patent: Dec. 11, 2012

(54) APPARATUS, SYSTEMS AND METHODS TO SYNCHRONIZE COMMUNICATION OF CONTENT TO A PRESENTATION DEVICE AND A MOBILE DEVICE

(75) Inventor: Thomas S. Taylor, Atlanta, GA (US)

(73) Assignee: Echostar Technologies L.L.C., Englewood, CO (US)

( * ) Notice: Subject to any disclaimer, the term of this patent is extended or adjusted under 35 U.S.C. 154(b) by 607 days.

(21) Appl. No.: 11/836,462

(22) Filed: Aug. 9, 2007

(65) Prior Publication Data

US 2009/0044229 A1  Feb. 12, 2009

(51) Int. Cl.
| | |
|---|---|
| H04N 7/173 | (2011.01) |
| G06F 15/16 | (2006.01) |
| G09G 5/00 | (2006.01) |
| H04J 3/06 | (2006.01) |

(52) U.S. Cl. ............ 725/97; 725/90; 345/2.2; 709/233; 709/248; 370/503

(58) Field of Classification Search ................ 725/105, 725/86, 90; 345/2.2, 2.3; 709/232, 233, 709/248; 370/503
See application file for complete search history.

(56) References Cited

U.S. PATENT DOCUMENTS

| | | | |
|---|---|---|---|
| 5,610,916 A * | 3/1997 | Kostreski et al. ............. 370/487 |
| 6,195,701 B1 * | 2/2001 | Kaiserswerth et al. ....... 709/231 |
| 6,710,815 B1 * | 3/2004 | Billmaier et al. ............. 348/515 |
| 7,027,766 B2 * | 4/2006 | McAlinden ................... 455/3.01 |
| 7,136,399 B2 * | 11/2006 | Lanigan et al. ............... 370/517 |
| 7,188,193 B1 | 3/2007 | Getsin et al. |
| 7,614,070 B2 * | 11/2009 | Urdang et al. ................... 725/90 |
| 7,627,808 B2 * | 12/2009 | Blank et al. ................... 715/200 |
| 2002/0065564 A1 * | 5/2002 | Sheriff et al. ................... 700/11 |
| 2002/0104092 A1 | 8/2002 | Arai et al. |
| 2003/0208765 A1 * | 11/2003 | Urdang et al. ................... 725/90 |
| 2003/0223422 A1 * | 12/2003 | Igarashi et al. ............... 370/390 |
| 2004/0103150 A1 | 5/2004 | Ogdon et al. |
| 2004/0103444 A1 * | 5/2004 | Weinberg et al. ............. 725/132 |
| 2004/0244057 A1 * | 12/2004 | Wallace et al. ............... 725/135 |
| 2005/0251823 A1 * | 11/2005 | Saarikivi ........................ 725/42 |
| 2006/0079305 A1 * | 4/2006 | Gartrell et al. ............. 455/575.8 |
| 2007/0067808 A1 * | 3/2007 | DaCosta ......................... 725/62 |

(Continued)

FOREIGN PATENT DOCUMENTS

| | | |
|---|---|---|
| JP | 2002-232861 A | 8/2002 |
| JP | 2006-186454 A | 7/2006 |

OTHER PUBLICATIONS

International Search Report for PCT Application PCT/US2008/071489, received on Jan. 23, 2009.

(Continued)

Primary Examiner — James R Sheleheda
(74) Attorney, Agent, or Firm — Seed IP Law Group PLLC (57) ABSTRACT

A programming communication synchronizer embodiment communicates a portion of a program to a receiving device during a first time period, communicates a corresponding portion of the program to a mobile device during a second time period, and coordinates the first time period with the second time period so that the portion of the program is deliverable to a presentation device coupleable to the receiving device at approximately the same time the corresponding portion of the program is deliverable to the mobile device.

23 Claims, 6 Drawing Sheets

U.S. PATENT DOCUMENTS

| | | | |
|---|---|---|---|
| 2007/0107032 A1* | 5/2007 | Rachamadugu | 725/114 |
| 2007/0177492 A1* | 8/2007 | Walker | 370/203 |
| 2007/0220561 A1* | 9/2007 | Girardeau et al. | 725/80 |
| 2007/0283380 A1* | 12/2007 | Aoki et al. | 725/32 |
| 2008/0016255 A1* | 1/2008 | Saint-Hilaire et al. | 710/11 |
| 2008/0291266 A1* | 11/2008 | Burckart et al. | 348/21 |
| 2008/0291891 A1* | 11/2008 | Jerlhagen et al. | 370/350 |
| 2009/0059962 A1* | 3/2009 | Schmidt et al. | 370/503 |
| 2009/0320073 A1* | 12/2009 | Reisman | 725/51 |

OTHER PUBLICATIONS

English translation of Notice of Rejection Ground for corresponding Japanese Patent Application No. 2010-520133, mailed Jun. 5, 2012, 2 pages.

Notice of Rejection Ground for corresponding Japanese Patent Application No. 2010-520133, mailed Jun. 5, 2012, 2 pages.

* cited by examiner

FIG.8 ced. It is to be appreciated that FIG. 1 is just one
APPARATUS, SYSTEMS AND METHODS TO SYNCHRONIZE COMMUNICATION OF CONTENT TO A PRESENTATION DEVICE AND A MOBILE DEVICE

TECHNICAL FIELD

The technical field relates to systems and methods for audio/video/data content providers and, more particularly, to apparatus, systems and methods for synchronizing communication of audio/video/data content to a presentation device and a mobile device.

BRIEF SUMMARY

Apparatus, systems and methods for communicating programming are disclosed. According to one embodiment, a method comprises communicating a portion of a program to a receiving device during a first time period, communicating a corresponding portion of the program to a mobile device during a second time period, and coordinating the first time period with the second time period so that the portion of the program is deliverable to a presentation device coupleable to the receiving device at approximately the same time the corresponding portion of the program is deliverable to the mobile device According to another embodiment, a system comprises a first transmitter operable to communicate a portion of a program receivable by a receiving device during a first time period, a second transmitter operable to communicate a corresponding portion of the program receivable by a mobile device during a second time period, and a program communication synchronizer operable to coordinate the communication of the portion of the program receivable by the receiving device with the communication of the corresponding portion of the program receivable by the mobile device so that the program is deliverable to a presentation device coupled to the receiving device at approximately the same time that the corresponding portion of the program is deliverable to the mobile device.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
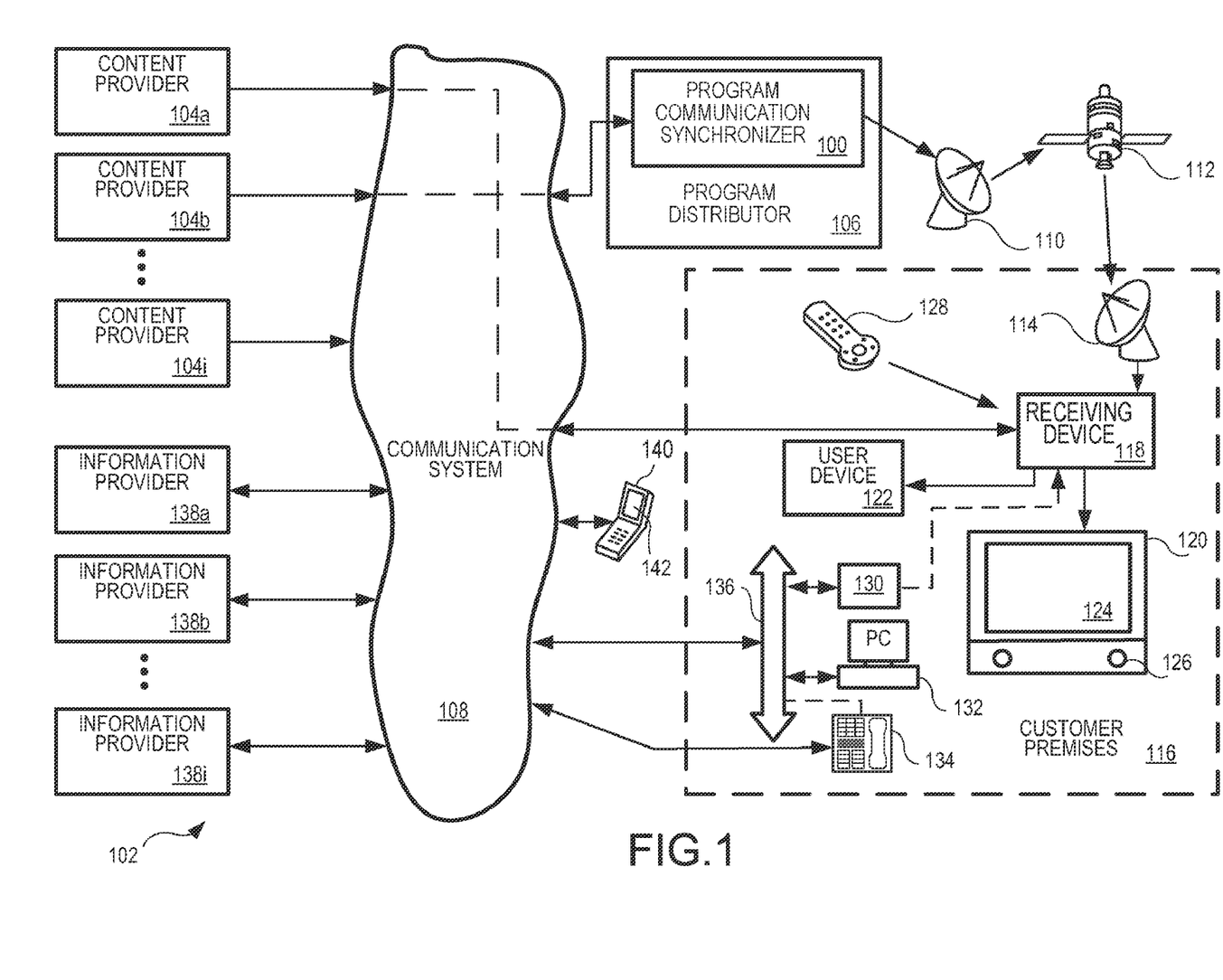
FIG. 1 is an overview block diagram illustrating an exemplary communication network.

FIG. 1 is an overview block diagram illustrating an exemplary communication network 102 in which embodiments of the programming communication synchronizer 100 may be implemented. It is to be appreciated that FIG. 1 is just one example of a communications network and that the various embodiments discussed herein are not limited to such exemplary network. Communication network 102 can include a variety of communication systems and can use a variety of communication media including, but not limited to, satellite wireless media.

Television service providers provide their customers with a multitude of audio/video and/or data programming (hereafter, collectively and/or exclusively "programming") at their premises. The customer premises 116 may be a business, home, multiple dwelling unit, or other facility to which the programming is delivered. Such programming is often provided by use of a receiving device 118 (FIG. 1) communicatively coupled to a presentation device 120 configured to receive the programming.

Receiving device 118 interconnects to a one or more communications media or sources (such as a cable head-end, satellite, telephone company switch, Ethernet portal, off-air antenna, or the like) that provide the programming. The receiving device 118 commonly receives a plurality of programming by way of the communications media or sources described in greater detail below. For example, the receiving device 118 may be communicatively coupled to a satellite antenna 114 which receives data from the uplink center 110 via the satellite 112. Based upon selection by the user, the receiving device 118 processes and communicates the selected programming to the one or more presentation devices 120.

Receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the receiving device 118, presentation device 120, and/or other user devices 122.

Examples of a presentation device 120 include, but are not limited to, a television (TV), a personal computer (PC), a sound system receiver, a digital video recorder (DVR), a compact disk (CD) device, a game system, or the like. Presentation devices 120 may employ a display 124, one or more speakers, input device 126, or other output devices to communicate audio, video, and/or data content to a user. In many implementations, one or more presentation devices 120 reside in or near a customer's premises 116 and are communicatively coupled, directly or indirectly, to the receiving device 118.

Some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like. One or more endpoint devices, such as PCs 132, data storage devices, TVs, game systems 130, telephone 134, sound system receivers, Internet connection devices, digital subscriber loop (DSL)

devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other.

Television service providers provide their customers a multitude of audio, video and/or data programming (hereafter, collectively and/or exclusively "programming" or "program(s)"). Such programming is often provided by use of a receiving device 118 (such as, a personal computer, television or other device configured to receive programming, a set-top box, a cable box, a satellite receiver, or the like) which interconnects a communications medium or source of the programming (such as a cable head-end, satellite antenna 114, telephone company switch, Ethernet portal, off-air antenna, or the like) to a presentation device (such as a television (TV), a personal computer (PC), a sound system receiver, a digital video recorder (DVR), a compact disk (CD) device, a game system, or the like).

People may not be present at their premises 116 to view programming on a presentation device 118, such as a television or the like. However, there is still a desire to view the programming while away from their premises 116 so that they will not miss viewing the programming. In some cases, people will inconveniently alter their schedules in order to be at their premises 116 to view selected programming.

People may alternatively view programming on other types of interconnecting devices, such as mobile devices 140 or the like. Examples of mobile devices 140 are cell phones, personal media players (PMP's), personal digital assistants (PDA's), laptop computers, handheld personal computers (HPC's), and the like. Such mobile devices 140 permit the user to electronically send, receive, create, edit, and manage information. In some embodiments, mobile device 140 includes an output element 142, such as a display, speaker, memory, or the like, that is operable to present the programming.

Received program content and/or information is converted by devices (not shown) at the program distributor 106 into a suitable signal for communication over a cellular network. The cellular network 216 (FIG. 2) is broadly encompassed within the communication system 108. The cellular network 216 may be any available network suitable for transmitting and receiving data between mobile and/or fixed point devices, or the cellular network 216 may be dedicated to a primary purpose of delivering the information to known subscribers. In such dedicated embodiments, subscribers receive and transmit information between a mobile device 140 and the program distributor 106. It is to be appreciated that the cellular network 216 may include both wired and wireless infrastructure; for example, transceivers, repeaters, switches, antennas, routers, public switched telephone networks, codecs, multiplexers, de-multiplexers, and the like.

The above-description of the communication network 102, and the various devices therein, is intended as an overview of the environment in which various embodiments of the programming communication synchronizer 100 may be implemented in. The communication network 102, and the various devices therein, may contain other devices, systems and/or media not specifically described above.

Figure 2:
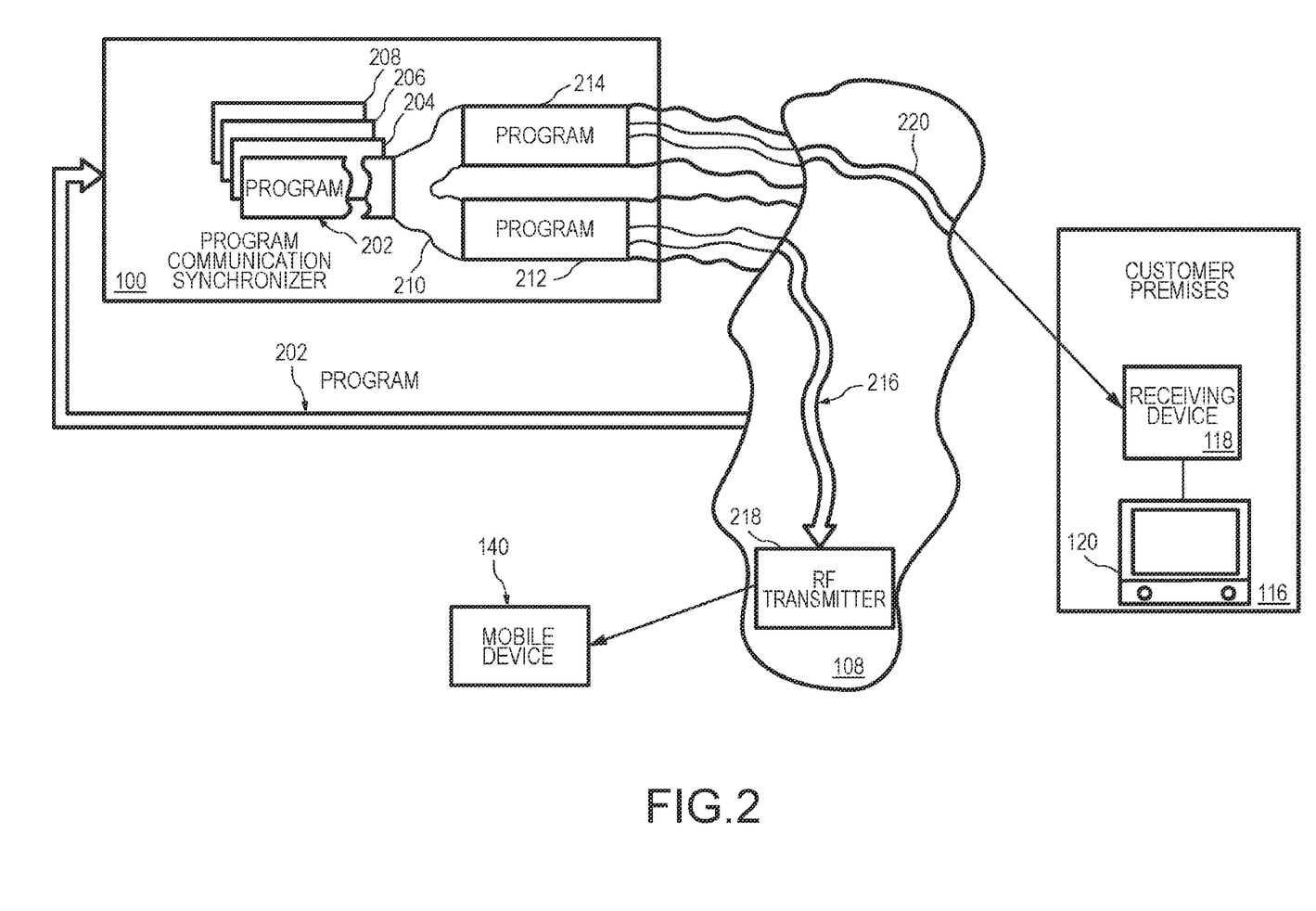
FIG. 2 is a block diagram conceptually illustrating communication of a program by an embodiment of a programming communication synchronizer.

FIG. 2 is a block diagram conceptually illustrating communication of a program 202 by an exemplary embodiment of a programming communication synchronizer 100. The program 202, provided by content providers 104a-104i and information providers 138a-138c (FIG. 1), is received at an input transceiver (not shown) of the program distributor 106 and communicated to the program communication synchronizer 100.

Program distributor 106 processes the program 202 by selectively adding additional information, such as addressing and routing information 204, synchronization information 206, and/or other information 208 thus creating processed program 210. Additionally, the resolution and/or quality of the program 202 may be modified to facilitate communication to particular subscribers, over different media, and/or to different types of devices.

Program 212 and program 214 are generated from processed program 210 by wholly, or partially, copying or reproducing program 202 and associated additional information 204, 206, 208 into a format particularly suitable for communication over a targeted medium in the communication system 108. Some embodiments may partition processed program 210 and then generate portions of program 212 and program 214. The processed program 210 may be used to generate many programs that are communicated to particular subscribers, over different media, and/or to different types of devices. However, only two programs 212, 214, are shown for simplicity.

Program 212 is configured for communication to mobile device 140 via, for example, but not limited to, cellular network 216. Program 214 is configured for communication to the above-described receiving device 118. It is to be appreciated that programs 212, 214 may have different characteristics, as described below.

Program 212 is particularly suited for communication over a cellular network 216, such as a cellular phone system employing a radio frequency (RF) communication medium. A network of one or more RF transmitters 218 is operative to communicate the program 212 to a mobile device 140. It will be appreciated that the program 212 may be communicated as a signal propagated to a single mobile device 140 or to a plurality of mobile devices (not shown).

Program 214 is particularly suited for communication to receiving device 118. Program 214 may be communicated over another medium having a higher capacity (or bandwidth) than the cellular network 216. Program 214 may be a signal propagated to a specific receiving device 118 or to a plurality of receiving devices 118 (not shown). Non-limiting examples of communication mediums used by program 214 include, but are not limited to, satellite, cable, fiber optic, or similarly capable systems, or even a combination of systems, generally denoted as system 220. The delivery medium of the program 214 is operative to communicate the program 214 to a receiving device 118 residing in the subscriber's premises 116 so that information corresponding to the program 214 may be presented on the presentation device 120.

Figure 3:
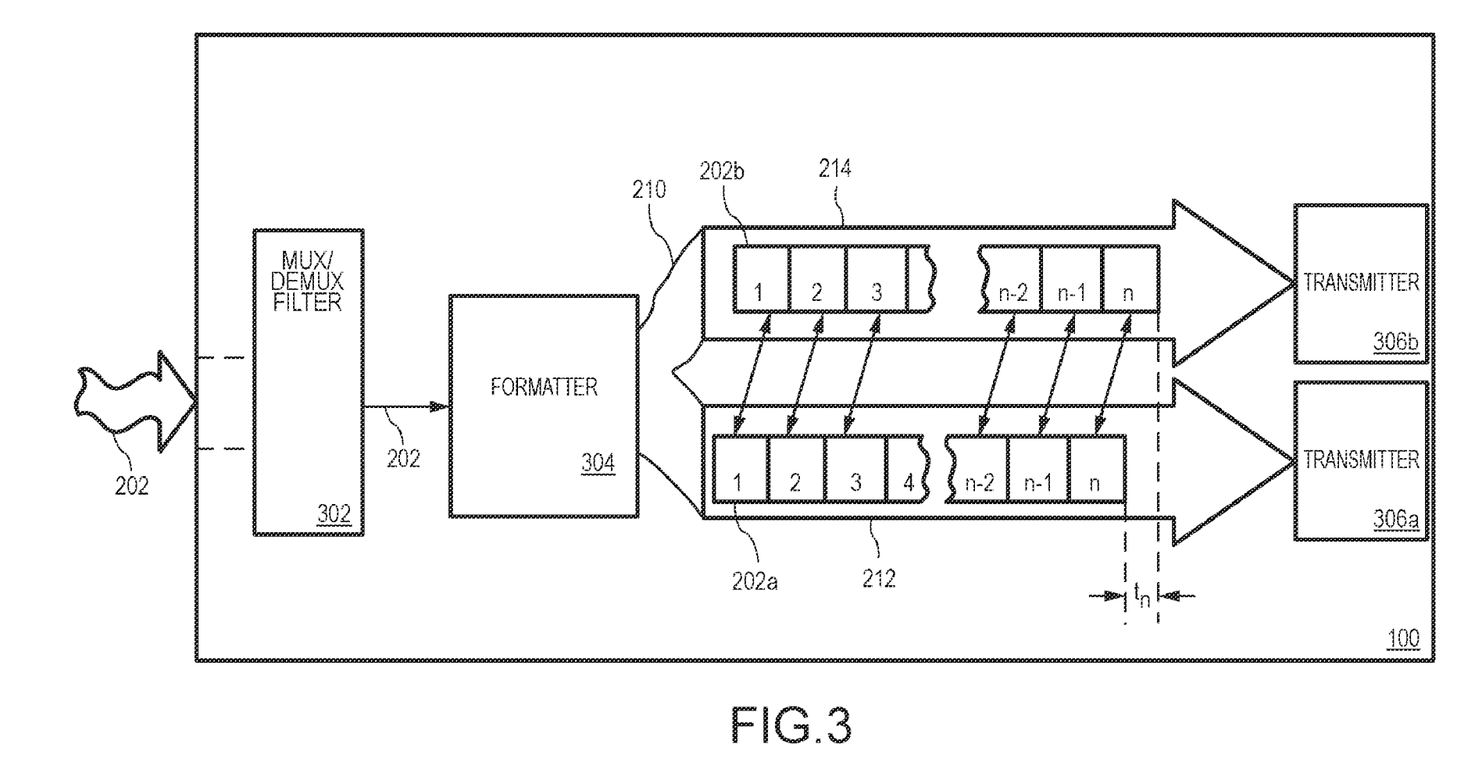
FIG. 3 is a conceptual diagram illustrating generation of the programs into program portions.

FIG. 3 is a conceptual diagram illustrating generation of programs 212, 214 into program portions 1-n by program communication synchronizer 100. In some embodiments, programs 212, 214 are partitioned or otherwise formatted into portions so that the program portions may be packetized for communication over a packetized communication system.

The program 202 is received by multiplex/de-multiplex filter 302. The program 202 may, for example, be de-multiplexed to remove routing and/or other information used to facilitate communication of the program 202 to the program distributor 106. The program 202 may be multiplexed with additional information for future construction of the program content into programs 212, 214. Further, or alternatively, program 202 may be filtered or otherwise processed as necessary for communication to a targeted medium or device class.

In an embodiment, the program 202 is then selectively processed by formatter 304. Formatter 304 generates the encoded multiple programs 212, 214. Formatter 304 processes the program 202 by adding or manipulating information in a manner that may include, but is not limited to, compression, encryption, timing, security, and/or synchronization. Subscriber and/or other high-level information may also be added to "build" a particular program suitable for communication beyond the program distributor 106.

As noted above, in some embodiments, programs 212 and/or 214 are generated from program 202. Programs 212 and/or 214 may be partitioned into a plurality of program portions 1-n, which are serially communicated as sequences 202a and 202b, respectively. In some embodiments, the program portions 1-n are communicated as a plurality of packets in a packetized network architecture. The program portions 1-n may include synchronization components, such as, but not limited to unique identifiers, time tags, coded numbers, or the like, which provide synchronization of the program presentation on a presentation device at an appropriate time.

In some embodiments, information residing in the program portions 1-n of sequences 202a and 202b may be identical. In other embodiments, information residing in program portions 1-n of sequences 202a and 202b may be different. For example, a program portion in sequence 202a may have two video frames of information, and a corresponding program portion in sequence 202b may have three frames of video information. Thus, program portions 1-n of sequences 202a and 202b may be different to facilitate transportation over the particular communication medium that is transporting the programs 212, 214.

Sequences 202a and 202b, which respectively correspond to programs 212 and 214, are communicated to respective transmitters 306a, 306b. Sequences 202a and 202b are then communicated from the respective transmitters 306a, 306b to the targeted destination devices, here, the mobile device 140 and the receiving device 118 (FIG. 1).

Transmitter 306a communicates sequence 202a, corresponding to program 212, through the cellular network 216 to mobile device 140. Sequence 202a may be communicated over other types of communication media residing in communication system 108 before ultimately being communicated to mobile device 140 via the cellular network 216. Accordingly, it is to be appreciated that the format of the information in sequence 202a may be changed as needed to facilitate communication over the particular type of medium used.

Transmitter 306b communicates sequence 202b, corresponding to program 214, through the system 220 to receiving device 118. Sequence 202b may be communicated over one or more types of communication media residing in communication system 108 before ultimately being communicated to receiving device 118. Accordingly, it is to be appreciated that the format of the information in sequence 202b may be changed as needed to facilitate communication over the particular type of medium used.

In some embodiments, program 212 may be formatted for communication to mobile devices 140 having a particular set of characteristics. For example, where mobile devices 140 have displays with a lower resolution than typical receiving devices 118, some information may be removed from program sequence 202a without a perceptible or unacceptable reduction in quality when the program sequence 202a is presented on the mobile device 140. That is, program 212 may be generated using low-resolution images, and/or may be generated with fewer image frames per second. Similarly, other formatting changes may facilitate more efficient communication of the program 212 to the mobile device 140.

In some embodiments, program 214 may formatted for communication to receiving devices 118, presentation devices 120, and other devices having a particular set of characteristics. Program 214 may be formatted for example, but not limited to, analog broadcast, high definition (HD), or standard definition (SD).

Embodiments of the programming communication synchronizer 100 are operable to generate and communicate the sequences 202a and 202b, respectively corresponding to programs 212 and 214, such that the content of program 212 is presented on the mobile device 140 at substantially the same time that the content of program 214 is presented on presentation device 120. For example, if a television show corresponding to programs 212 and 214 starts at 8:00 p.m., the program portions 1-n in sequence 202a corresponding to the start of the television show are presented on the mobile device 140 at substantially or approximately 8:00 p.m. Similarly, the program portions 1-n in sequence 202b corresponding to the start of the television show are presented on the presentation device 120 at substantially or approximately 8:00 p.m.

In situations where the time to communicate a program portion 1-n of sequence 202a to mobile device 140 is approximately the same as the time to communicate a corresponding program portion 1-n of sequence 202b to presentation device 120, embodiments of the programming communication synchronizer 100 will communicate corresponding program portions 1-n at, or approximately, the same time. That is, where the time delay from the initial communication of program portion 1-n to the mobile device 140 and the receiving device 118 is the same, or approximately the same, transmitter 306a communicates its respective program portion 1-n at the same time that transmitter 306b communicates its respective program portion 1-n.

Alternatively, in situations where the time to communicate a program portion 1-n of sequence 202a to the mobile device 140 is different from the time to communicate a corresponding program portion 1-n of sequence 202b to presentation device 120, then embodiments of the programming communication synchronizer 100 will communicate corresponding program portions 1-n of program sequences 202a, 202b at different times.

Accordingly, a known propagation time of a program portion 1-n communicated from the program distributor 106 to a destination device is used to determine and/or control when program portions 1-n are communicated from program distributor 106 via their respective communications medium. That is, the above-described propagation times are used to determine the communication timing of the corresponding program portions 1-n of sequences 202a and 202b. The difference in propagation times is used to determine when the program portions 1-n are communicated with respect to each other.

As a non-limiting example, communicating program 214 via a satellite network to a presentation device 118 in a known geographic location may result in the presentation device 118 receiving a program portion 1-n of sequence 202b, corresponding to program 214, at a first time. Communicating program a portion 1-n of sequence 202a, corresponding to program 212, via a cellular network 216 to mobile device 140 in a known geographic location may result in the mobile device 140 receiving a program portion 1-n of sequence 202a at a second time. The difference between the first time and the second time may be expressed as time difference, $t_n$. Thus, $t_n$ expresses a time relationship between program 212 and program 214. In some embodiments, the time difference $t_n$ is known and/or pre-defined. In some embodiments, the time difference $t_n$ is calculated. Accordingly, $t_n$ may be used in some embodiments by the programming communication synchronizer 100 to advance or delay communication of program 212 with respect to program 214.

By way of a non-limiting example, an embodiment of processing within the program communication synchronizer 100 is described with reference to a specific scenario. In the example, assume that a particular subscriber of a content provider is a dedicated a sports fan and avid follower of a particular football team. The subscriber purchases premium programming from the provider specifically to watch football games of that particular football team that are available via the premium programming package, and the football games are communicated as "live" events. In this example, further assume that the subscriber has worked late and will not be home at the time the broadcast of the "live" football game begins. However, at the time the football game begins, assume that the subscriber is commuting home, but does not arrive home until after the start of the football game (but while the game is still in progress).

During the commute home, the subscriber initiates a communication with mobile device 140 (a cell phone) over a cellular network. The subscriber is able to watch the first part of the football game during the commute home on their cell phone 140. That is, program portions 1-n of sequence 202a corresponding to the football game are received by the cell phone 140 and presented on the cell phone display.

Upon arriving home, the subscriber then initiates a communication by turning on and operating the receiving device 118 and presentation device 120. Thus, program portions 1-n of sequence 202b are communicated to receiving device 118, and the football game is presented on presentation device 120.

In the example above, the program distributor 106, via program communication synchronizer 100, coordinated communication of the football game for presentation on the presentation device 120 with communication of the football game for presentation on the mobile device 140. The coordination permitted the subscriber to view the initial part of the game on a cell phone 140 while commuting home, and then view the remainder of the game on a presentation device 120. It is to be appreciated from the example above that a subscriber may view a program concurrently on both the mobile device 140 and the presentation device 120. It is to be further appreciated that the presentation to both devices is at approximately the same time.

Figure 4:
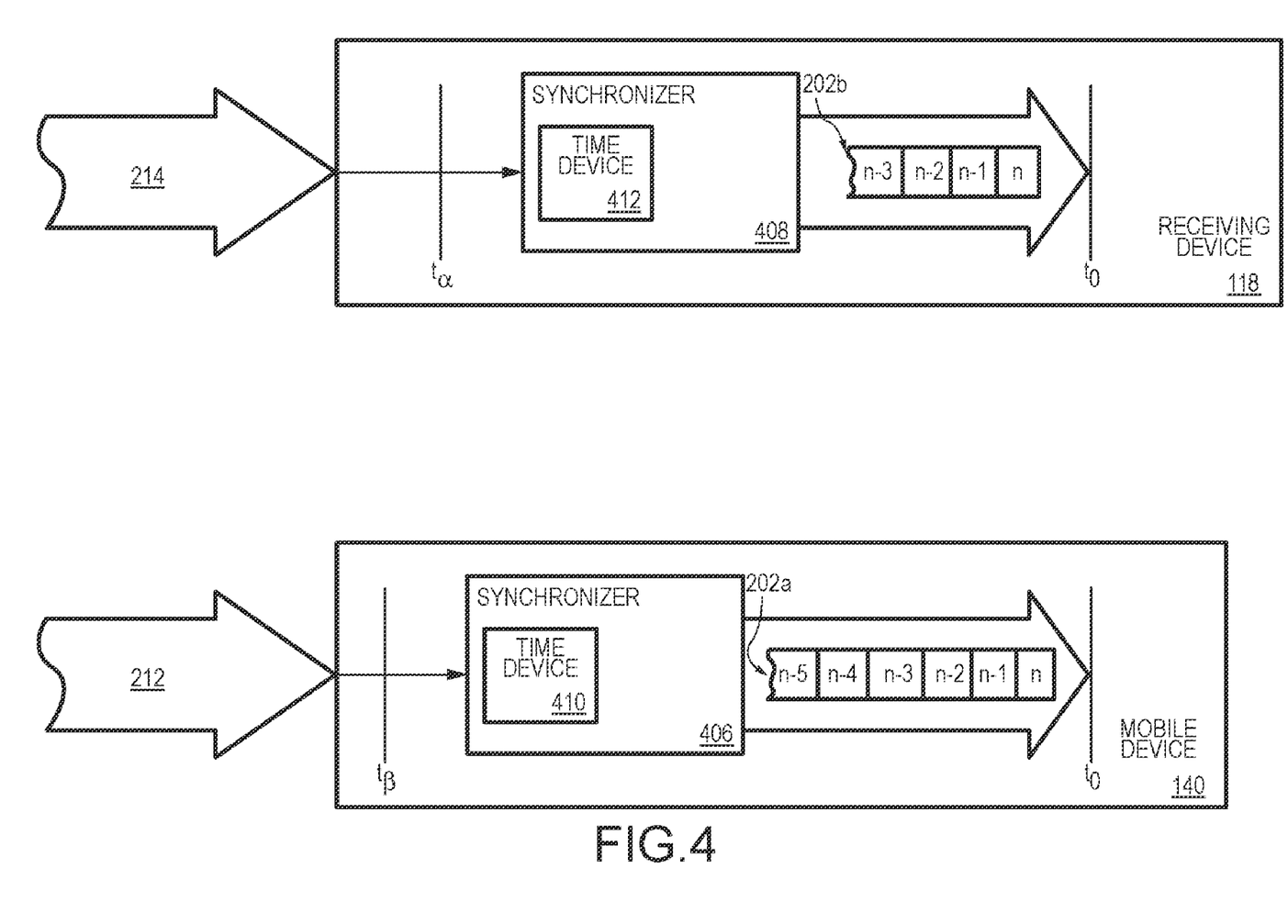
FIG. 4 illustrates embodiments of a mobile device and a receiving device.

FIG. 4 illustrates exemplary embodiments of a mobile device 140 and a receiving device 118. The program distributor 106 communicates program 212 to the mobile device 140 and communicates program 214 to receiving device 118. The program distributor 106, or program content providers 104a-104i (FIG. 1), may optionally embed synchronization components and/or other synchronization information 206 (FIG. 2) into the programs 212, 214 at known points. For example, synchronization information 206 may indicate the start of a program, end of a program, or any other time or point of interest in the program. Examples of synchronization information 206 include, but are not limited to, timing information, real-time markers, sequencing tags, coded identifiers, or the like. The synchronization information 206 may be used to identify corresponding points in time of the programs 212 and 214.

Program portions 1-n of sequence 202b, corresponding to program 214, are received by receiving device 118 during a first time period. Program portions 1-n of sequence 202a, corresponding to program 212, are received by mobile device 140 during a second time period. As described in greater detail below, the first and second time periods are coordinated such that the program portions 1-n of programs 214 and 212 are presented on a presentation device 120, coupleable to receiving device 118, and a mobile device 140 at approximately the same time.

The moment in time when mobile device 140 begins processing program portions 1-n of sequence 202a is represented by vertical line $T_\beta$. Correspondingly, the moment in time when receiving device 118 begins processing program portions 1-n of sequence 202b is represented by vertical line $T_\alpha$.

Mobile device 140 operates to process program portions 1-n of program 202a and to present program portions 1-n at a time illustrated by vertical line $T_0$. Receiving device 118 operates to process program portions 1-n of program 202b and to present program portions 1-n at a time illustrated by vertical line $T_0$. It is thus recognized that in the mobile device 140 and in the receiving device 118, corresponding program portions 1-n of programs 202a and 202b are presented at time $T_0$.

When the time it takes for program portions 1-n to propagate through the system 220 (FIG. 2) and the time it takes for program portions 1-n to propagate through the cellular network 216 (FIG. 2) are the same, or approximately the same, then the moment in time $T_\beta$ when the mobile device 140 begins processing program portions 1-n of sequence 202a and the moment in time $T_\alpha$ when the receiving device 118 begins processing program portions 1-n of sequence 202b are approximately the same. However, when the above-described propagation times are the different, then $T_\beta$ and $T_\alpha$ are different. The difference between $T_\beta$ and $T_\alpha$ corresponds to the difference in propagation times.

Mobile device 140 may have an optional synchronizer 406. Receiving device 118 may have an optional synchronizer 408. Both synchronizers are described in more detail below.

The optional synchronizer 406 of mobile device 140 comprises, or is coupled to, a time device 410. Time device 410 may be a hardware clocking circuit, a software protocol, or the like. The synchronizer 406 operates to coordinate the timing of the presentation of the received program portions 1-n of sequence 202a so as to present program portions 1-n of program 202a at time $T_0$ in accordance with the above-described synchronization information 206, if present. For example, the synchronization information 206 may indicate that the program 212 is scheduled to start at 8:00 p.m. Accordingly, synchronizer 406 may coordinate the presentation of program 212 at 8:00 p.m. using the above-described synchronization information 206 and the time provided by the time device 410. That is, the received time is compared with the embedded synchronization information 206 so that a mobile device 140 may present the program portions 1-n at a predefined time.

Similarly, the optional synchronizer 408 of receiving device 118 comprises, or is coupled to, a time device 412. Time device 412 may be a hardware clocking circuit, a software protocol, or the like. The synchronizer 408 operates to coordinate the timing of the presentation of the received program portions 1-n of sequence 202b so as to present program portions 1-n of sequence 202b at time $T_0$ in accordance with the above-described synchronization information 206, if present. For example, the synchronization information 206 may indicate that the program 214 is scheduled to start at 8:00 p.m. Accordingly, synchronizer 408 may coordinate the presentation of the program 214 at 8:00 p.m. using the above-described synchronization information 206 and the time provided by the time device 412.

In embodiments where one, both, or neither of the mobile device 140 and the receiving device 118 have synchronizers 406, 408, respectively, the programs 212, 214 will be presented on or about the same time $T_O$. That is, in exemplary embodiments, a subscriber will be presented with program portions 1-n of program 202a on his or her mobile device 140 at about the same time as a subscriber will be presented with program portions 1-n of program 202b on a presentation device 120 (not shown) coupled to the subscriber's receiving device 118. However, embodiments with optional synchronizers 406, 408 are able to present the program in a more time coordinated manner.

It is to be appreciated that, with respect to FIG. 4, a connection between a mobile device 140 and a cellular network 216 (FIG. 2) may be established by dialing a phone number and initiating the call process. In some embodiments, the connection process may be manually initiated by a subscriber and/or the connection process may be initiated automatically. For example, but not limited to, a program in the receiving device 118, the mobile device 140, or another device, may establish a connection at a particular time. In another example, a subscriber may establish a connection to the mobile device 140 by taking action with another devices, such as, but not limited to, a remote control 128 (FIG. 1), an Internet hyperlink, or the like. Here, the process of establishing a connection may be made via the receiving device 118 when in communication with the mobile device 140. If a particular phone number is dialed from the mobile device 140, then the mobile device 140 will be communicatively coupled to the program distributor 106, and the mobile device 140 will begin receiving program 212. It is further appreciated that several subscribers may asynchronously and/or concurrently initiate a connection between their mobile device 140 and the cellular network 216. When each subscriber initiates such a connection, in a manner described above, for example, then each subscriber will be communicatively coupled to the program distributor 106 and each subscriber will receive program 212 on their mobile device 140.

When program 212 is received by the mobile device 140 via communication system 108, an account or the like associated with the mobile device 140 may be debited for time used (e.g.; minutes or the like) to communicate the program 212. Some embodiments may be operable to directly communicate with receiving device 118, or another suitable device, such that the program 212 is received by the mobile device 140 (without communication over communication system 108). In such situations, the account associated with the mobile device 140 would not be debited for the communication time.

Figure 5:
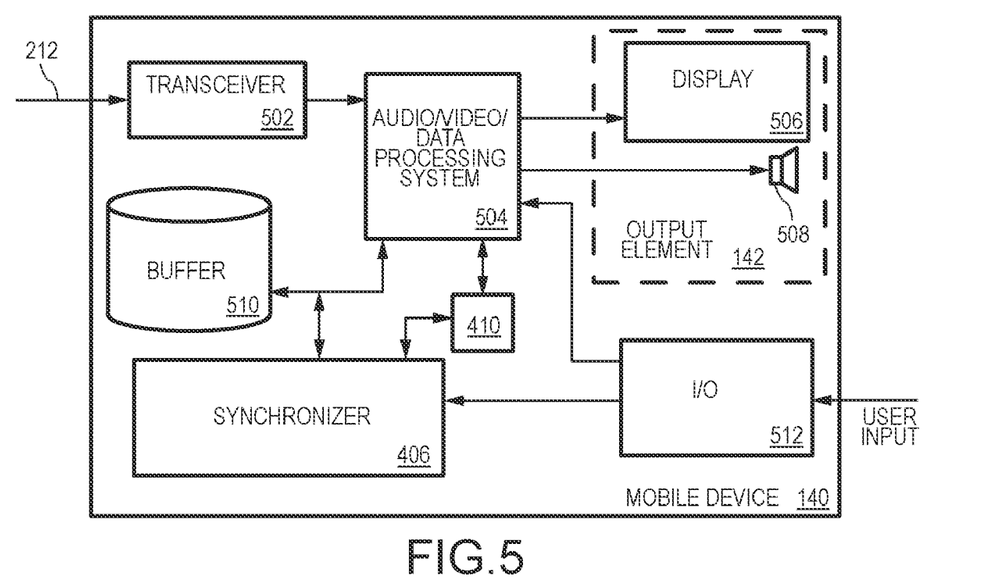
FIG. 5 is a block diagram illustrating a mobile device in greater detail.

FIG. 5 illustrates a mobile device 140 in greater detail. Mobile device 140 comprises radio frequency (RF) transceiver 502, audio/video/data processing system 504, display 506, speaker 508, buffer 510, input/output (I/O) 512, synchronizer 406 and timer device 410. Mobile device 140 further comprises an output element 142. FIG. 5 illustrates display 506 and speaker 508 as residing within output element 142, but it is appreciated that the output element 142 may be internal or external to the mobile device 140, and may have some or all of displays, speakers, and other outputs, including but not limited to, vibrators, light emitting diodes, storage cards, other electronic devices, and the like. It is further appreciated that other components or systems residing in the mobile device 140 are not shown.

RF transceiver 502 provides an interface to cellular network 216 (FIG. 2) of communications system 108 (FIG. 1). RF transceiver 502 receives the above-described program portions 1-n of program sequence 202a, corresponding to program 212, and communicates the program portions 1-n of program sequence 202a to the audio/video/data processing system 504.

The audio/video/data processing system 504 assembles or otherwise reconstructs the received program portions 1-n of program sequence 202a into program 212. Buffer 510 may be used to temporarily store the reconstructed program 212, so that the audio/video/data processing system 504 can retrieve and present program 212. Audio/video/data processing system module 504 renders the program 212 into a format suitable for presentation of the video portion of program 212 on display 506 and presentation of the audio portion of program 212 on speaker 508. It is to be appreciated that the audio/video/data processing system module 504 may also present program 212 to other output elements 142 and/or devices (not shown).

I/O 512 is operable to receive user instructions. A user is able to initiate communication between the mobile device 140 and the program distributor 106, such as by entering a phone number or other suitable identifier using I/O 512. Further, embodiments may enable the user to select what programming is communicated to the mobile device 140.

I/O 512 may further provide control to the synchronizer 406 so that the timing of the presentation of the program 212 may be adjusted. For example, the user may concurrently be viewing program 212 on mobile device 140 and program 214 on presentation device 120. The programs 212 and 214 may not be in exact synchronization. Accordingly, the user may adjust the timing of the presentation of program 212 to better match the presentation of program 214. Thus, the user may be able to advance, delay, rewind, or even pause the presentation of program 212 on the mobile device 140.

Figure 6:
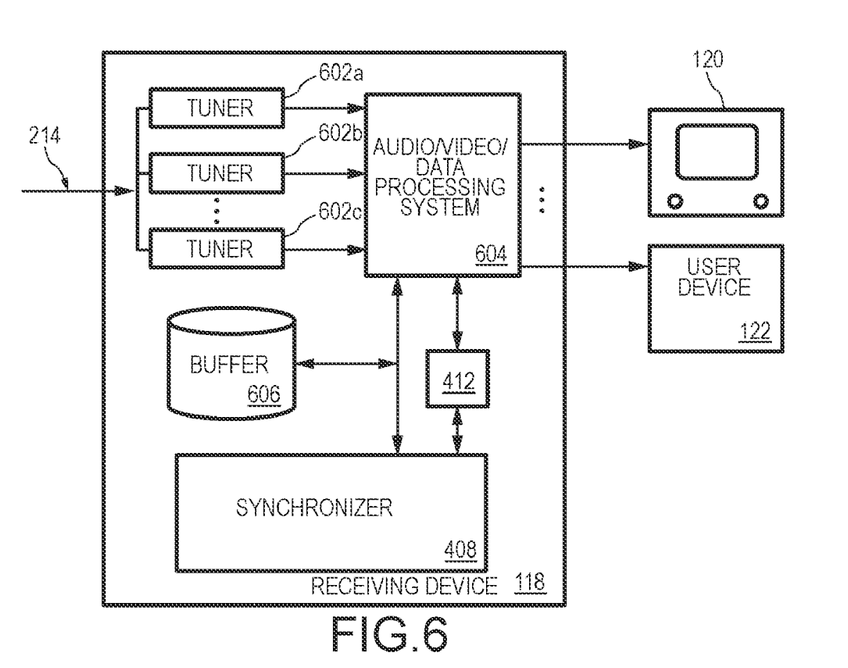
FIG. 6 is a block diagram illustrating a receiving device in greater detail.

FIG. 6 illustrates a receiving device 118 in greater detail. Receiving device 118 comprises tuners 602a-602c, video processing system 604, buffer 606, synchronizer 408, and time device 412. The receiving device 118 is communicatively coupled to presentation device 120 and/or user device 122. It is to be appreciated that other components or systems residing in the receiving device 118 are not shown.

One or more tuners 602a-602c provide an interface to communications system 108 (FIG. 1). Tuners 602a-602c receive the above-described program portions 1-n of program sequence 202b, corresponding to program 214, and communicate the program portions 1-n of program sequence 202b to the processing system 604.

The audio/video/data processing system 604 assembles or otherwise reconstructs the received program portions 1-n of program sequence 202b into program 214. Audio/video/data processing system 604 renders the program 214 into a format suitable for presentation of the video portion of program 214 on presentation device 120 and/or user device 122. Buffer 606 may be used to temporarily store the reconstructed program 214, so that the audio/video/data processing system 604 can retrieve and communicate program 214 to presentation device 120 and/or user device 122. It is to be appreciated that additional features, such as advance, pause, rewind, stop, play, and other features not described in detail herein may be present in embodiments of the receiving device 118.

Figure 7:
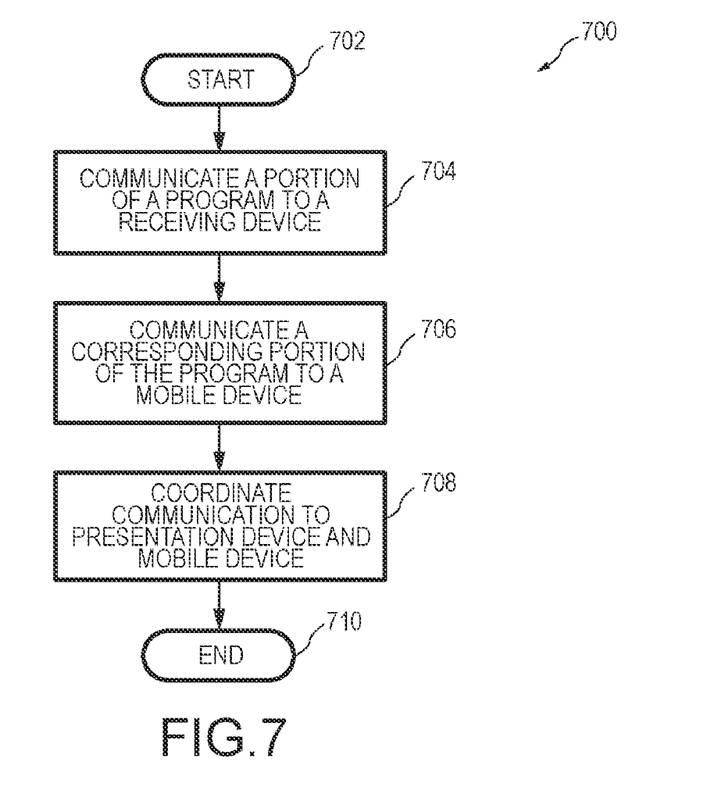
FIG. 7 is a flowchart illustrating a process used by an embodiment of the programming communication synchronizer.
Figure 8:
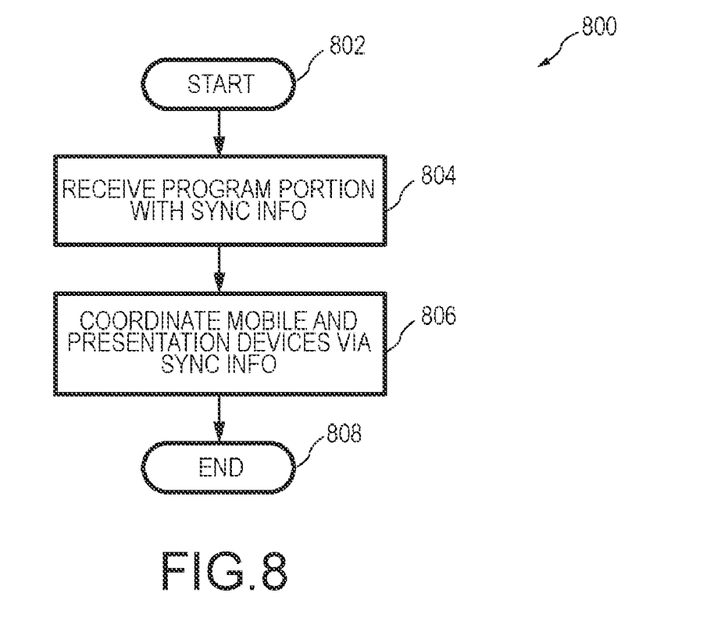
FIG. 8 is a flowchart illustrating a process used by an embodiment of the programming communication synchronizer.

FIGS. 7 and 8 are flowcharts 700 and 800, respectively, illustrating processes that may be used by embodiments of the programming communication synchronizer 100 (FIG. 1). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 7, the process 700 is ongoing with operation of the program distributor 106 (FIG. 1), and is illustrated as starting at 702. At 704, a portion of a program is communicated to a receiving device 118 during a first time period. At 706, a corresponding portion of the program is communicated to a mobile device 140 during a second time period. At 708, the first time period is coordinated with the second time period so that the portion of the program is deliverable to a presentation device 120 coupleable to the receiving device 118 at approximately the same time the corresponding portion of the program is deliverable to the mobile device 140. The process ends at 710.

With respect to FIG. 8, the process 800 is ongoing with operation of the mobile device 140 (FIG. 1), and is illustrated as starting at 802. At 804, a portion of a program is received with a mobile device 140, the program portion having synchronization information therein. At 806, the synchronization information is coordinated with real time so that the portion of the program is presented on the mobile device at approximately the same time a corresponding portion of the program is presentable on a presentation device 120. The process ends at 808.

While various embodiments have been described hereinabove, it is to be appreciated that various changes in form and detail may be made without departing from the spirit and scope of the invention(s) presently or hereafter claimed.

The invention claimed is:

1. A method to communicate programming, comprising:
   communicating, via a communicating device, an audio/video portion of a program to a receiving device at a first location during a first time period;
   communicating, via the communicating device, based on a difference in propagation times between communicating to the receiving device and communicating to the mobile device, a corresponding audio/video portion of the program to a mobile device at a second location during a second time period, the second time period being different than the first time period; and
   coordinating, by the communicating device, the first time period with the second time period when the first location is the same as the second location, wherein the coordinating includes advancing or delaying communication of the audio/video portion of the program receivable by the receiving device with respect to communication of the corresponding audio/video portion of the program receivable by the mobile device so that the audio/video portion of the program is receivable by a presentation device coupleable to the receiving device at approximately the same time the corresponding audio/video portion of the program is receivable by the mobile device.

2. The method of claim 1, comprising:
   communicating the portion of the program to the presentation device.

3. The method of claim 2, comprising:
   presenting the program on the presentation device; and
   presenting the corresponding portion of the program on a display of the mobile device such that the corresponding portion of the program is presented at approximately the same time that the portion of the program is presented on the presentation device.

4. The method of claim 1 wherein coordinating the first time period with the second time period comprises:
   initiating communication of the portion of the program receivable by the presentation device at a first time; and
   initiating communication of the corresponding portion of the program receivable by the mobile device at a second time.

5. The method of claim 4 wherein the first time is related to the second time by a predefined amount of time.

6. The method of claim 1, comprising:
   establishing a connection between the mobile device and a cellular network; and
   communicating the corresponding portion of the program receivable by the mobile device via the cellular network.

7. The method of claim 1, comprising:
   embedding a synchronizing component with the corresponding portion of the program receivable by the mobile device, the synchronizing component identifying a known point in the program;
   receiving the corresponding portion of the program with the embedded synchronizing component at the mobile device;
   storing at least the received corresponding portion of the program with the embedded synchronizing component into a memory residing in the mobile device;
   retrieving the corresponding portion of the program from the memory; and
   presenting the corresponding portion of the program on the mobile device based upon the embedded synchronizing component.

8. The method of claim 1, comprising:
   formatting the portion of the program for presentation on the presentation device; and
   formatting the corresponding portion of the program for presentation on the mobile device.

9. The method of claim 1, comprising:
   embedding synchronization information into the corresponding portion so that the mobile device coordinates the synchronization information with real time.

10. A system that communicates programming, comprising:
    a first transmitter of a communication device operable to communicate an audio/video portion of a program receivable by a receiving device during a first time period;
    a second transmitter of the communication device operable to communicate a corresponding audio/video portion of the program receivable by a mobile device during a second time period, the second time period being different than the first time period; and
    a program communication synchronizer of the communication device operable to calculate a time difference between communication of the audio/video portion of the program receivable by the receiving device and communication of the corresponding audio/video portion of the program receivable by the mobile device, the program communication synchronizer further operable to coordinate operation of at least one of the first and second transmitters based on a difference in propagation times between communicating to the receiving device and communicating to the mobile device so that the audio/video portion of the program is receivable by a presentation device coupled to the receiving device at approximately the same time that the corresponding audio/video portion of the program is receivable by the mobile device.

11. The system of claim 10, comprising:
    a radio frequency (RF) transceiver operable to communicate the corresponding portion of the program to the mobile device via an RF network.

12. The system of claim 10 wherein the first transmitter comprises:
a satellite transmitter operable to communicate the portion of a program receivable by the receiving device via a satellite signal.

13. The system of claim 10 wherein the first transmitter comprises:
a cable system transmitter operable to communicate the portion of the program receivable by the receiving device via a cable system.

14. The system of claim 10 wherein the program communication synchronizer comprises:
a formatter operable to generate program content in a first format associated with the receiving device, and operable to generate corresponding program content in a second format corresponding to the mobile device.

15. The system of claim 14 wherein the formatter is operable to communicate the program content to the first transmitter and is operable to communicate corresponding program content to the second transmitter.

16. The system of claim 10 wherein the program communication synchronizer comprises:
a formatter operable to generate the corresponding portion of the program in a format associated with the mobile device; and
the formatter is operable to communicate the corresponding portion of the program to the second transmitter.

17. The system of claim 10 wherein the program communication synchronizer is operable to embed synchronization information into the corresponding portion of the program, the synchronization information coordinateable with real time by the mobile device.

18. A method to communicate programming, comprising:
communicating, via a communicating device, an audio/video portion of a program to a receiving device at a first location during a first time period;
communicating, via the communicating device, a corresponding audio/video portion of the program to a mobile device at a second location during a second time period, the second time period being different than the first time period;
determining a first time delay corresponding to a first time of propagation associated with communicating the audio/video portion of the progrm to the receiving device;
determining a second time delay corresponding to a second time of propagation associated with communicating the corresponding audio/video portion of the program to the mobile device;
calculating a difference between the first time of propagation and the second time of propagation; and
coordinating, via the communicating device, communication of the audio/video portion of the program receivable by the receiving device with communication of the corresponding audio/video portion of the program receivable by the mobile device based upon the calculated difference such that the audio/video portion of the program is receivable by the receiving device at approximately the same time as the corresponding audio/video portion of the program is receivable by the mobile device.

19. The method of claim 18, comprising:
adjusting a start of the second time period based upon the difference between the first time delay and the second time delay.

20. A non-transitory computer readable medium having a program to communicate programming, the program comprising logic configured to perform the steps of:
communicating, via a communicating device, an audio/video portion of a program to a receiving device during a first time period;
communicating, via the communicating device, a corresponding audio/video portion of the program to a mobile device during a second time period, the second time period being different than the first time period; and
coordinating, via the communicating device, based on a difference in propagation times between communicating to the receiving device and communicating to the mobile device, the first time period with the second time period so that presentable content of the audio/video portion of the program is received by a user's presentation device coupled to the receiving device at approximately the same time presentable content of the corresponding audio/video portion of the program is received by the same user's mobile device.

21. The computer readable medium of claim 20 wherein the coordinating comprises:
coordinating communication of the portion of the program receivable by the presentation device with communication of the corresponding portion of the program receivable by the mobile device so that the portion of the program is deliverable to the presentation device at approximately the same time the corresponding portion of the program is deliverable to the mobile device.

22. The computer readable medium of claim 20, comprising:
communicating the portion of the program to the presentation device.

23. The computer readable medium of claim 22, comprising:
presenting the program on the presentation device; and
presenting the corresponding portion of the program on a display of the mobile device such that the corresponding portion of the program is presented at approximately the same time that the portion of the program is presented on the presentation device.

* * * * *